3,183,220
UNSATURATED CYCLIC COMPOUNDS

Henri G. G. Dekking, Montville, N.J., assignor to Celanese Corporation of America, New York, N.Y., a corporation of Delaware
No Drawing. Filed Sept. 28, 1959, Ser. No. 842,601
8 Claims. (Cl. 260—88.2)

This invention relates to new ethylenically unsaturated compounds and polymers thereof.

It is an object of this invention to provide new ethylenically unsaturated compounds. It is a further object of this invention to provide ethylenically unsaturated compounds which may be polymerized into useful high melting polymers. It is a still further object of this invention to provide new polymers useful in a wide variety of applications, e.g. in the formation of fibers, films and molded articles. Other objects will become apparent from the following description and claims.

In accordance with one aspect of this invention there are provided as new compounds allyl norbornylanes.

A particularly suitable group of compounds are the 2-allyl norbornylanes which have the formula

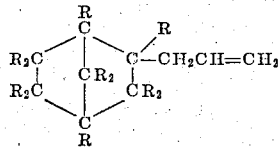

wherein the R's may be any of various radicals including hydrogen, alkyl, e.g., containing up to 4 carbon atoms such as methyl, ethyl, propyl and n-butyl, and aryl such as phenyl, naphthyl, and the latter radicals substituted with alkyl groups e.g., containing up to 4 carbon atoms. The R's may be same or different. If the R's are all hydrogen atoms, the resulting compound is 2-allyl norbornylane. This compound may also be called 3-(2-bicyclo[2.2.1]heptyl)propene-1.

Other specific allyl norbornylanes are 1-methyl-2-allyl norbornylane, 2-allyl-3-methyl norbornylane, 2-allyl-7-methyl norbornylane, 2-allyl-3-ethyl norbornylane, 1-allyl norbornylane, 7-allyl norbornylane, 2-methyl-7-allyl norbornylane, 2-ethyl-7-allyl norbornylane, 3-(alpha-methyl) allyl norbornylane and 3-(alpha-ethyl) allyl norbornylane.

In the allyl norbornylanes of this invention, an allyl group may be substituted on any of the carbon atoms of the norbornylane structure. Moreover, the ring carbon atoms may be bonded to any of the radicals included in the definition of R in the formula given in the discussion above of 2-allyl norbornylanes. In addition, the hydrogen atoms of the alpha carbon atom of the allyl group, e.g., the carbon atom not bonded by an ethylenic bond, may be substituted with any of various radicals including alkyl, e.g., containing up to 4 carbon atoms and aryl groups such as phenyl. The substituent groups on the ring carbon atoms and in the allyl group may be the same or different.

The above compounds may be prepared from the corresponding halo compound, e.g. the chloride or bromide, by reacting the latter with magnesium to form a Grignard reagent and reacting the Grignard reagent with an allyl halide, e.g., allyl bromide, to form the allyl norbornylane. For example, a 2-allyl norbornylane may be prepared in accordance with the following equations, where X is halogen.

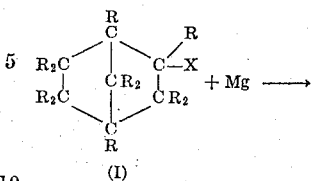
(I)

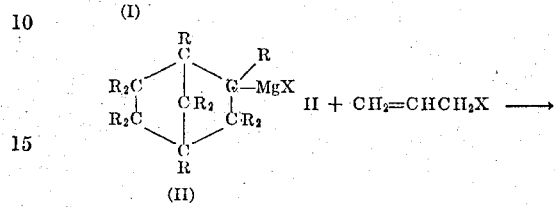
(II)

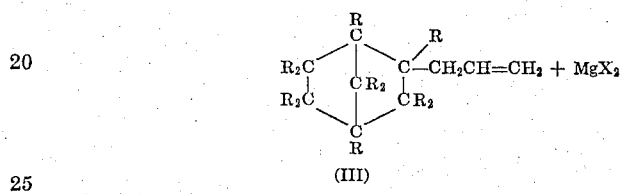
(III)

In many cases, the halo compound used to prepare the Grignard reagent may be prepared by reacting the corresponding bicyclo-alkene with a hydrogen halide. Thus 2-allyl norbornylane may be prepared from norbornylene as in the following equations:

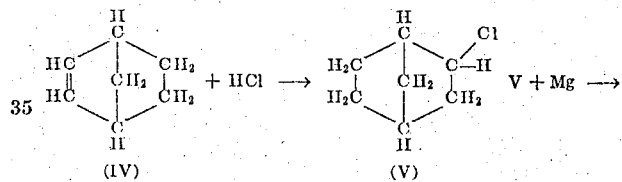
(IV)    (V)

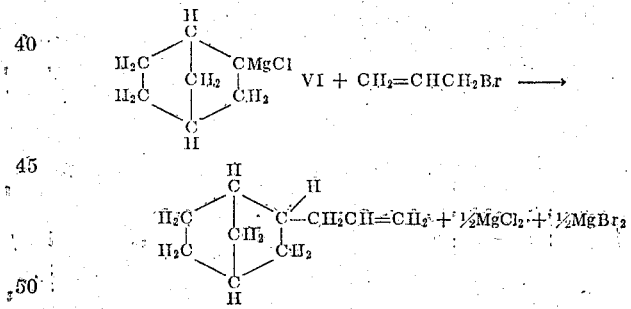

The following example illustrates the preparation of 2-allyl norbornylane as shown in the above equations. All parts are by weight.

Example 1

Anhydrous hydrogen chloride was passed in a solution of 115 parts of norbornylene in 230 parts of dried n-pentane, cooled to −70° C. The reaction was exothermic. After 2 hours, maintaining a temperature of −60° C. to −70° C., the reactants were allowed to reach room temperature after which they were shaken with a dilute aqueous solution of sodium hydroxide. The organic layer was dried. n-Pentane was distilled off at atmospheric pressure and the residue fractionated. 113 parts of a fraction boiling at 49° C. at 11 millimeters of mercury pressure absolute were collected. This fraction contains some unsaturated material which was partially removed by washing with cold concentrated sulfuric acid. The remainder was 2-chloronorbornylane.

To a vessel which was previously purged with prepurified nitrogen were charged 73 parts of magnesium powder and 70.8 parts of anhydrous ether. A crystal of iodine and 10 parts of 2-chloronorbornylane prepared as described above were added. After a few minutes a vigorous reaction ensued and a solution of 316 parts of 2-chloronorbonylane in 708 parts of anhydrous ether was added at a rate to maintain constant reflux. After 3 hours the addition was completed and the mixture was refluxed for 3 more hours. Acid-base titration indicated the formation of 314 parts of norbornyl magnesium chloride.

To a mixture of 363 parts of allyl bromide and 212.4 parts of ether in a vessel previously purged with prepurified nitrogen were added the mixture containing the 314 parts of norbornyl magnesium chloride prepared as described above. The unreacted magnesium from the Grignard reagent was held back by careful decantation. The exothermic addition lasted for 3¾ hours during which time the reactant became more and more turbid. The slurry was stirred for 4 more hours at room temperature and the magnesium halide-etherate was then allowed to settle. The clear supernatant liquid was then washed with a dilute aqueous ammonium chloride solution followed by water and the organic layer was added to another organic layer obtained by decomposing the solid magnesium halide-etherate on ice plus ammonium chloride. The latter treatment has the effect of liberating the organic liquids still clinging to the solid magnesium halide-etherate. Ether was distilled off on a steam bath and the residue dried and fractionated to yield 143 parts of a fraction boiling at 62 to 63° C. at 15 millimeters mercury pressure and an index of refraction ($N_D^{25}$) of 1.4700. Infra-red analysis confirmed the structure of 2-allyl norbornylane.

In accordance with another aspect of this invention, the cyclic compounds may be homopolymerized to form polymers of high softening point. In addition, these compounds may be copolymerized with other monomers to form copolymers of improved properties. For example they may be copolymerized with hydro-carbon comonomers e.g. etheylene, propylene, n-butylene, isobutylene and 4-methylpentene. The amount of comonomer in the monomeric mixture may vary for example between 0.5 and 99.5 percent by weight.

The polymerization may be suitably carried out in the presence of a catalyst system comprising two components, one of which is a compound of a transition metal from Group IIIa, IVa, Va, or VIa of the Periodic Table (Mendeléeff) in which the metal has a valence above its most reduced state. Some suitable compounds are the halides such as chlorides, bromides and iodides, the alcoholates such as butylates and acetylacetonates. Particularly preferred are the halides, e.g., titanium tetrachoride or trichloride and zirconium tetrachloride.

The second component of the catalyst system is a metallo-organic compound or a hydride of at least one member of the class consisting of aluminum and the Group Ia, IIa and IIb metals of the Periodic Table (Mendeléeff), or one or more of these metals in finely dispersed, free form. The metallo-organic compounds have a metal atom directly linked to a carbon atom.

A preferred group of compounds which may be used as the second component are the organo-aluminum compounds, e.g. aluminum trialkyls in which the alkyl groups contain 1 to 10 carbon atoms such as triisobutyl aluminum, aluminum triaryls such as triphenyl, aluminum alkyl halides, such as aluminum methyl sesquihalide, and lithium aluminum alkyls such as lithium aluminum tetramethyl.

Other metallo-organic compounds which may be used are for example dimethyl zinc and various Grignard reagents such as phenyl magnesium bromide. Examples of hydrides and free, finely dispersed metals which may be used are the hydrides and free forms of aluminum, lithium and sodium.

The transition metal compound may be suitably used in an amount of 0.01 to 0.1 part by weight per part of monomer and the second component in an amount of 0.1 to 10 parts by weight per part of transition metal compound.

The polymerization may be conveniently carried out in the presence of a solvent for the monomeric material. Among the suitable solvents are aromatic hydrocarbons, such as xylene and cycloaliphatic hydrocarbons such as cyclohexane and decahydronaphthalene. The amount of solvent used is preferably from about 1 to about 5 parts by weight per part of monomer.

The polymerization is suitably carried out under moderate conditions, e.g. a temperature of 25 to 80° C. and at atmospheric or higher pressure.

The following examples illustrate the preparation of polymers in accordance with the invention.

*Example II*

50 cc. of dry xylene were charged to a vessel which had been flushed with prepurified nitrogen. A slow stream of prepurified nitrogen was bubbled through the solvent and this stream was maintained throughout the polymerization reaction. After 10 minutes, 10 millimols of titanium tetrachloride were added to the vessel and the solution heated to 70° C. after which 32 cc. of 1.25 molar triisobutyl aluminum in xylene were added in the course of ½ hours. The reactants were kept at 70° C. and after the aluminum alkyl had been added 15 cc. of 2-allyl norbornylane were poured into the vessel. After 2 hours at 70° C. the reaction mixture became quite viscous. After a total of 6 hours at 70° C. the mixture was cooled and poured in a mixture of methanol and hydrochloric acid. The solid polymer precipitated and was freed of catalyst particles by stirring in a Waring Blendor with a mixture of methanol and hydrochloric acid. After drying the polymer overnight in a vacuum oven, 6.2 grams of poly-2-allyl norbornylane were obtained.

The polymer was extracted with heptane by 24 hours reflux in a Soxhlet extractor. The heptane soluble portion of the polymer had an inherent viscosity of 0.2 as obtained from a 0.1 percent solution in decahydronaphthalene at 135° C. The heptane insoluble portion of the polymer which was 76 percent by weight of the total had an ordered X-ray diffraction pattern. Infra-red analysis confirmed that the polymer had a structure resulting from the polymerization of 2-allyl norbornylane through the ethylenic unsaturation of the allyl group. This portion of the polymer had a softening point of about 300° C. and was insoluble in decahydronaphthalene at 135° C. and in 1,1,2,2-tetrachloroethane at 135° C.

*Example III*

200 cc. of dry xylene were charged at atmospheric pressure to a vessel which had been flushed with prepurified nitrogen. A slow stream of prepurified nitrogen was bubbled through the solvent and this stream was maintained throughout the polymerization reaction. After 10 minutes, 40 millimoles of titanium tetrachloride were added. The solution was then warmed to 60° C. and 160 millimoles of aluminum triisobutyl as a 1.25 molar solution in xylene were added in the course of ½ hour followed by 50 grams of 2-allyl norbornylane added at once. Ethylene was then bubbled into the solution and the reaction mass was stirred at 75° C. for 6 hours, after which the polymer was precipitated by pouring the solution into a mixture of methanol and hydrochloric acid. The polymer was extracted with heptane by 24 reflux in a Soxhlet extractor to yield 54.5 grams of a heptane soluble block copolymer of 86.5% of 2-allyl norbornylane and 13.5% of ethylene which melted at 115° C.

The polymers of this invention have a wide variety of uses. For example, they may be used in the production of film and molded articles such as household ware, containers, closures, toys etc. Moreover, the more highly melting polmers may be formed into fibers for the manufacture of textiles.

It is to be understood that the foregoing detailed description is given merely by way of illustration and that many variations may be made therein without departing from the spirit of my invention.

Having described my invention what I desire to secure by Letters Patent is:

1. A homopolymer of 2-allyl norbornylane.
2. A homopolymer of a compound having the formula

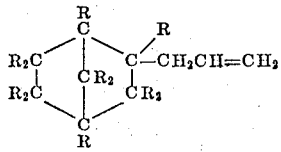

wherein each R is separately selected from the group consisting of hydrogen, lower alkyl containing up to 4 carbon atoms, phenyl, naphthyl, phenyl radicals substituted with alkyl groups containing up to 4 carbon atoms and naphthyl radicals substituted with alkyl groups containing up to 4 carbon atoms.

3. A copolymer of an olefin containing from 2 to 6 carbon atoms and a compound having the formula:

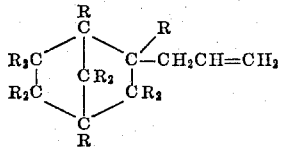

wherein each R is separately selected from the group consisting of hydrogen, lower alkyl containing up to 4 carbon atoms, phenyl, naphthyl, phenyl radicals substituted with alkyl groups containing up to 4 carbon atoms and naphthyl radicals substituted with alkyl groups containing up to 4 carbon atoms.

4. A coploymer of 2-allyl norbornylane and an olefin containing from 2 to 6 carbon atoms.

5. A process of forming a copolymer of an olefin containing from 2 to 6 carbon atoms and a compound of the formula:

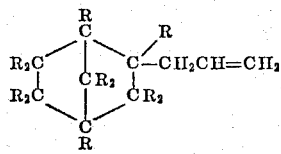

wherein each R is separately selected from the group consisting of hydrogen, alkyl containing up to 4 carbon atoms, phenyl, napthyl, phenyl radicals substituted with alkyl groups containing up to 4 carbon atoms and naphthyl radicals substituted with alkyl groups containing up to 4 carbon atoms admixed with an organic solvent for said compound and a catalyst system comprising a titanium halide, in which the titanium has a valence above two and an organo-aluminum compound in which an aluminum atom is directly bonded to a carbon atom.

6. A process comprising forming a copolymer of olefin containing from 2 to 6 carbon atoms and 2-allyl norbornylane admixed with an organic solvent for said 2-allyl norbornylane and a catalyst system comprising titanium tetrachloride and an aluminum trialkyl in which the alkyl groups contain up to 10 carbon atoms.

7. A process of forming a homopolymer of a compound of the formula:

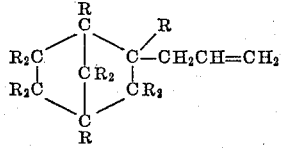

wherein each R is separately selected from the group consisting of hydrogen, alkyl containing up to 4 carbon atoms, phenyl, naphthyl, phenyl radicals substituted with alkyl groups containing up to 4 carbon atoms and naphthyl radicals substituted with alkyl groups containing up to 4 carbon atoms admixed with an organic solvent for said compound and a catalyst system comprising a titanium halide in which the titanium has a valence above two and an organo-aluminum compound in which an aluminum atom is directly bonded to a carbon atom.

8. A process comprising forming a homopolymer of 2-allyl norbornylane admixed with an organic solvent for said 2-allyl norbornylane and a catalyst system comprising titanium tetrachloride and an aluminum trialkyl in which the alkyl groups contain up to 10 carbon atoms.

References Cited by the Examiner

UNITED STATES PATENTS

| 2,427,345 | 9/47 | Bain | 260—675.5 |
| 2,799,668 | 7/57 | Anderson et al. | 260—93.1 |

FOREIGN PATENTS

| 777,414 | 6/57 | Great Britain. |
| 796,135 | 6/58 | Great Britain. |

OTHER REFERENCES

Felinsky et al.: Annalen, 476, 60–70 (1929).

Zabrodina et al.: Journal General Chemistry, U.S.S.R., vol. 27, 153–156 (1957) (English translation). (See also Chemical Abstracts, vol. 51, page 12864 (1957).)

Webster's New International Dictionary, second edition (1956), page 1913.

The Condensed Chemical Dictionary, Reinhold (5th edition) (1956), page 811.

JOSEPH L. SCHOFER, *Primary Examiner.*

MILTON STERMAN, H. N. BURSTEIN, M. LIEBMAN, WILLIAM H. SHORT, *Examiners.*